Figure 1:
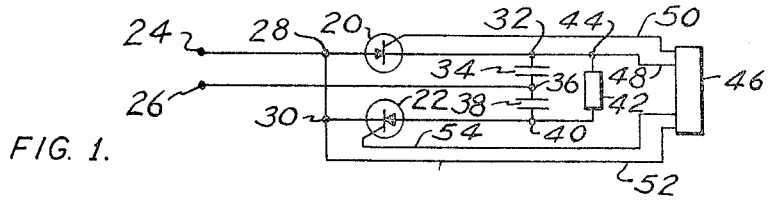

Dec. 6, 1966        N. WOLFF        3,290,580

VOLTAGE-MULTIPLYING AND RECTIFYING CIRCUIT

Filed March 22, 1963

INVENTOR.
NORMAN WOLFF
BY
Rey Eilers
ATTORNEY.

United States Patent Office 3,290,580
Patented Dec. 6, 1966

3,290,580
VOLTAGE-MULTIPLYING AND RECTIFYING CIRCUIT
Norman Wolff, Olivette, Mo., assignor to Vickers, Incorporated, Detroit, Mich., a corporation of Michigan
Filed Mar. 22, 1963, Ser. No. 267,154
3 Claims. (Cl. 321—15)

This invention relates to improvements in control systems. More particularly, this invention relates to improvements in voltage-multiplying circuits.

It is, therefore, an object of the present invention to provide an improved voltage-multiplying circuit.

It is frequently desirable to convert alternating current to direct current and to make the value of the resulting D.C. voltage a multiple of the value of the A.C. voltage. In some instances, it would be desirable to be able to adjust the value of the resulting D.C. voltage so that value could be a variable multiple, rather than a fixed multiple, of the value of the A.C. voltage. The present invention provides a voltage-multiplying circuit which can convert alternating current to direct current and which can make the value of the resulting D.C. voltage a variable multiple of the value of the A.C. voltage. It is, therefore, an object of the present invention to provide a voltage-multiplying circuit which can convert alternating current to direct current and which can make the value of the resulting D.C. voltage a variable multiple of the value of the A.C. voltage.

The present invention provides a voltage-multiplying circuit wherein a charge-storing component, usually consisting of a single capacitor or two serially-connected capacitors, is connected across a load, and wherein controlled rectifiers supply charges to that charge-storing component during alternate half-cycles of the alternating current. Specifically, during one half-cycle of the alternating current, one of the controlled rectifiers will supply a charge to the charge-storing component and during the next half-cycle of the alternating current the other of the controlled rectifiers will supply a charge to that charge-storing component. By varying the "firing angles" of the controlled rectifiers, the values of the charges supplied to the charge-storing component, and hence the value of the voltage across that charge-storing component and the load, can be varied. By appropriate varying of the "firing angles" of the controlled rectifiers, it is possible to make the value of the D.C. voltage across the load vary from zero to more than twice the root mean square value of the A.C. voltage. As a result, the voltage-multiplying circuit of the present invention makes it possible to provide a D.C. voltage which can be varied from zero to a value more than twice the root mean square value of the A.C. voltage. It is, therefore, an object of the present invention to provide a voltage-multiplying circuit which has a charge-storing component in parallel with a load and which uses controlled rectifiers to supply variable value charges to that charge-storing component during half-cycles of the alternating current.

The voltage-multiplying circuit provided by the present invention can be arranged so the polarity of the D.C. voltage supplied to the load can be reversed. Specifically, that voltage-multiplying circuit can be arranged so two sets of controlled rectifiers are connected to the charge-storing component which is connected in parallel with the load; and one of those sets of controlled rectifiers can be rendered operative whenever D.C. voltage of one polarity is desired, and the other of those sets of controlled rectifiers can be rendered operative whenever D.C. voltage of the opposite polarity is desired. This means that the voltage-multiplying circuit provided by the present invention can be used to convert alternating current to direct current of the desired polarity while also making the value of the resulting D.C. voltage a variable multiple of the value of the A.C. voltage. It is, therefore, an object of the present invention to use two sets of controlled rectifiers to supply variable value charges to a charge-storing component which is connected in parallel with a load and to selectively render one or the other of those sets of controlled rectifiers operative to provide the desired polarity for the D.C. voltage applied to that load.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 2:
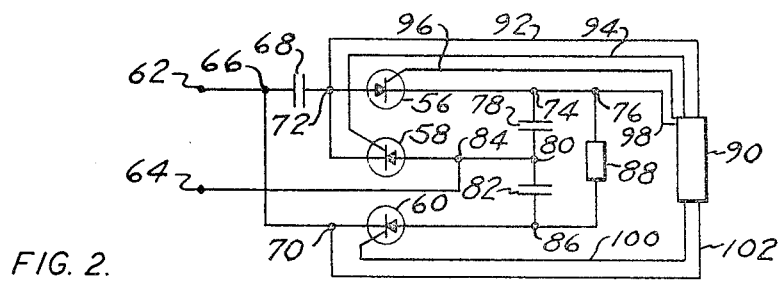
Figure 3:
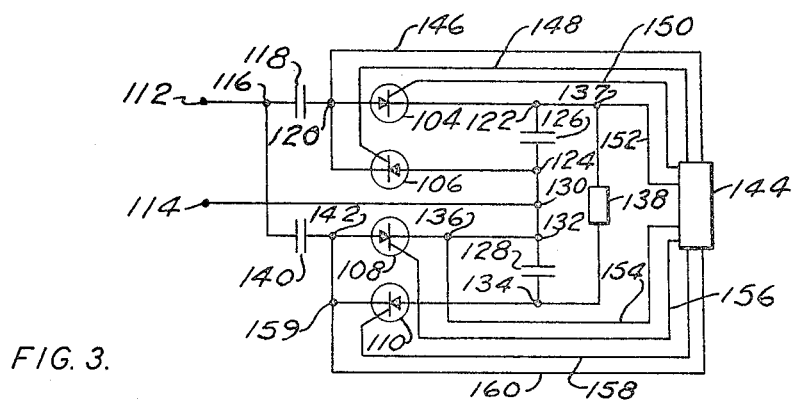
Figure 4:
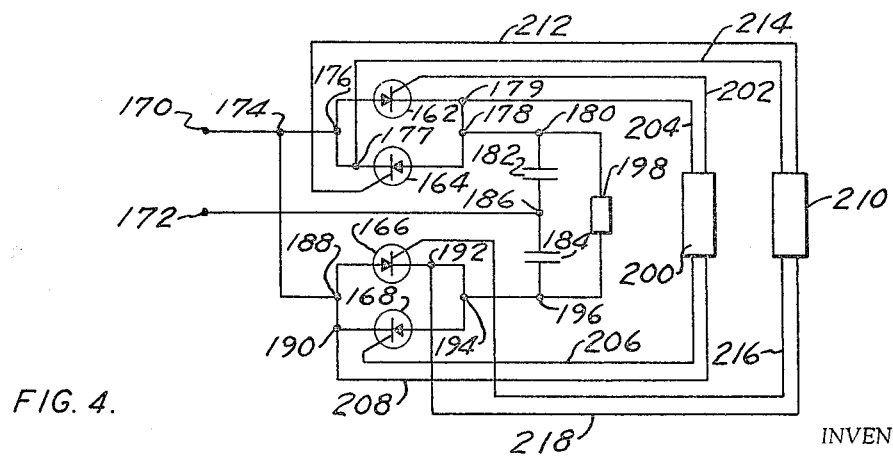

In the drawing,

FIG. 1 is a schematic diagram of one preferred form of voltage-multiplying circuit that is made in accordance with the principles and teachings of the present invention, FIG. 2 is a schematic diagram of a second preferred form of voltage-multiplying circuit that is made in accordance with tht principles and teachings of the present invention, FIG. 3 is a schematic diagram of a third preferred form of voltage-multiplying circuit that is made in accordance with the principles and teachings of the present invention, and FIG. 4 is a schematic diagram of a fourth preferred form of voltage-multiplying circuit that is made in accordance with the principles and teachings of the present invention.

Referring to FIG. 1 in detail, the numeral 20 denotes a controlled rectifier which will preferably be a silicon controlled rectifier. The numeral 22 denotes a second controlled rectifier which will preferably be a silicon controlled rectifier. The anode of the controlled rectifier 20 is connected to a terminal 24 by a junction 28, and the cathode of the controlled rectifier 22 is connected to that terminal by a junction 30 and by the junction 28. The terminal 24 and a terminal 26 can be suitably connected to a source of alternating current.

The terminal 26 is connected to the lower terminal of a capacitor 34 and to the upper terminal of a capacitor 38 by a junction 36. The upper terminal of the capacitor 34 is connected to the cathode of the controlled rectifier 20 by a junction 32, and the lower terminal of the capacitor 38 is connected to the anode of the controlled rectifier 22 by a junction 40. The lower terminal of a load 42 is directly connected to the junction 40, and the upper terminal of that load is connected to the junction 32 by a junction 44.

The numeral 46 denotes a source of firing signals for the controlled rectifiers 20 and 22; and one signal source which can be used for that purpose is shown on page 87 of the General Electric Controlled Rectifier Manual, copyright 1960. A conductor 48 and the junctions 44 and 32 connect the cathode of the controlled rectifier 20 to the signal source 46; and a conductor 50 connects the gate of that controlled rectifier to that signal source. A conductor 52 and the junction 30 connect the cathode of the controlled rectifier 22 to the signal source 46; and a conductor 54 connects the gate of that controlled rectifier to that signal source.

When the terminals 24 and 26 are connected to a source of alternating current, the terminal 24 will alternately become positive and negative relative to the terminal 26. When the terminal 24 becomes positive relative to the terminal 26, current will tend to flow through the controlled rectifier 20 and the capacitor 34; but current will not be able to flow through that controlled rectifier until that controlled rectifier receives a firing signal from the signal source 46. Similarly, whenever the terminal 24 is negative relative to the terminal 26, current will tend to flow through the capacitor 38 and the controlled rectifier 22; but current will not be able to flow through the controlled rectifier 22 until that controlled rectifier receives a firing signal from the signal source 46. This means that until the signal source 46 supplies firing signals to the controlled rectifiers 20 and 22, the voltage developed across the capacitor 34 and the voltage developed across the capacitor 38 will be zero. Consequently, until the signal source 46 supplies firing signals to the controlled rectifiers 20 and 22, the voltage developed across the load 42 will be zero.

If it is assumed that the signal source 46 supplies firing signals to the controlled rectifiers 20 and 22 close to the ends of the half-cycles of the alternating current supplied to the terminals 24 and 26, and if it is further assumed that the terminal 24 is positive relative to the terminal 26 during a given half-cycle of that alternating current, no current will flow through the controlled rectifier 20 during the first part of that half-cycle. However, close to the end of that half-cycle, the signal source 46 will supply a firing signal to the controlled rectifier 20 and thereby render that controlled rectifier conductive; and, thereupon, current will flow from terminal 24 via junction 28, controlled rectifier 20, junction 32, capacitor 34, and junction 36 to terminal 26. The resulting flow of current will cause the capacitor 34 to become charged with the upper terminal thereof positive and with the lower terminal thereof negative. At the end of the given half-cycle of the alternating current, the value of the current flowing through the controlled rectifier 20 will become so small that the said controlled rectifier will again become non-conductive.

During the first part of the next half-cycle of the alternating current supplied to the terminals 24 and 26, no current will flow through the controlled rectifier 22 because that controlled rectifier will not have received a firing signal from the signal source 46. However, close to the end of that next half-cycle, the signal source 46 will supply a firing signal to the controlled rectifier 22 and thereby render that controlled rectifier conductive; and, thereupon, current will flow from terminal 26 via junction 36, capacitor 38, junction 40, controlled rectifier 22, and junctions 30 and 28 to the terminal 24. The resulting flow of current will cause the capacitor 38 to become charged with the upper terminal thereof positive and with the lower terminal thereof negative. Since the lower terminal of the capacitor 34 is negative and is connected to the positive upper terminal of the capacitor 38 by the junction 36, the voltages across the capacitors 34 and 38 will be additive and will be applied to the load 42. At the end of that next half-cycle of the alternating current, the value of the current flowing through the controlled rectifier 22 will become so small that the said controlled rectifier will again become non-conductive.

During the succeeding half-cycles of the alternating current supplied to the terminals 24 and 26, current will again flow through the controlled rectifier 20 and the capacitor 34, and current will flow through capacitor 38 and the controlled rectifier 22. The resulting current flow will restore the charges which were stored within the capacitors 34 and 38 but which tended to dissipate as those capacitors caused current to flow through the load 42. As long as the signal source 46 is set to supply firing angles to the controlled rectifiers 20 and 22 close to the ends of the half-cycles of the alternating current supplied to the terminals 24 and 26, values of the voltages developed across the capacitors 34 and 38, and hence the value of the voltage developed across the load 42, will be relatively small.

If a higher value of voltage across the load 42 is desired, the signal source 46 can be adjusted to supply firing signals to the controlled rectifiers 20 and 22 closer to the beginnings of the half-cycles of the alternating current supplied to the terminals 24 and 26. By properly adjusting the signal source 46, it is possible to cause the value of the voltage between junctions 32 and 40, and hence the value of the voltage across the load 42, to have any desired value between zero and a value which approaches twice the peak voltage of the A.C. voltage supplied to the terminals 24 and 26. It should be apparent that the voltage-multiplying circuit of FIG. 1 provides this desirable result with a minimum of components and that the changes in the value of the D.C. voltage can be easily attained.

Referring to FIG. 2 in detail, the numerals 56, 58 and 60 denote controlled rectifiers which are preferably silicon controlled rectifiers. The numerals 62 and 64 denote terminals which are connectable to a source of alternating current; and the terminal 62 is connected to the anode of the controlled rectifier 56 and to the cathode of the controlled rectifier 58 by a junction 66, a capacitor 68, and a junction 72. The terminal 62 is connected to the cathode of the controlled rectifier 60 by the junction 66 and by a junction 70. A capacitor 78 has the upper terminal thereof connected to the cathode of the controlled rectifier 56 by a junction 74 and has the lower terminal thereof connected to the upper terminal of a capacitor 82 by a junction 80. The lower terminal of the capacitor 82 is connected to the anode of the controlled rectifier 60 by a junction 86. The junction 80 is connected to the anode of the controlled rectifier 58 by a junction 84. A load 88 has the lower terminal thereof directly connected to the junction 86 and has the upper terminal thereof connected to the junction 74 by a junction 76.

The numeral 90 denotes a signal source which can supply firing signals to the controlled rectifiers 56, 58 and 60. A conductor 92 and the junction 72 connect the cathode of the controlled rectifier 58 to the signal source 90; and a conductor 94 connects the gate of that controlled rectifier to that signal source. A conductor 96 connects the gate of the controlled rectifier 56 to the signal source 90; and a conductor 98 and the junctions 74 and 76 connect the cathode of that controlled rectifier to that signal source. A conductor 100 connects the gate of the controlled rectifier 60 to the signal source 90; and a conductor 102 and the junction 70 connect the cathode of that controlled rectifier to that signal source.

The signal source 90 can be generally similar to the signal source disclosed on page 87 of the said General Electric Controlled Rectifier Manual, but it should have three secondary transformer windings rather than just the two secondary transformer windings shown on page 87. The transformer secondary winding which is connected to the conductors 92 and 94 should be wound to have the same polarity as the secondary transformer winding which is connected to the conductors 100 and 102. As a result, the controlled rectifiers 58 and 60 will be rendered conductive at the same time.

When the terminals 62 and 64 are connected to a source of alternating current, the terminal 64 will alternately become positive and negative relative to the terminal 62. When the terminal 64 becomes positive relative to the terminal 62, current will tend to flow through the controlled rectifier 58 and the capacitor 68, and current also will tend to flow through the capacitor 82 and the controlled rectifier 60. However, current will not be able to flow through the controlled rectifiers 58 and 60 until those controlled rectifiers receive firing signals from the signal source 90. When the terminal 64 becomes negative relative to the terminal 62, current will tend to flow through capacitor 68, controlled rectifier 56 and capacitor 78; but current will not be able to flow through the controlled rectifier 56 until that controlled rectifier receives a firing signal from the signal source 90. This means that until the signal source 90 supplies firing signals to the controlled rectifiers 56, 58 and 60, the voltage developed across the capacitor 78 and the voltage developed across the capacitor 82 will be zero. Consequently, until the signal source 90 supplies firing signals to the controlled rectifiers 56, 58 and 60, the voltage developed across the load 88 will be zero.

If it is asumed that the signal source 90 supplies firing signals to the controlled rectifiers 56, 58 and 60 close to the beginnings of the half-cycles of the alternating current supplied to the terminals 62 and 64, and if it is further assumed that the terminal 64 is positive relative to the terminal 62 during a given half-cycle of that alternating current, current will flow from terminal 64 via junction 84, controlled rectifier 58, junction 72, capacitor 68, and junction 66 to the terminal 62. Current also will flow from terminal 64 via junctions 84 and 80, capacitor 82, junction 86, controlled rectifier 60, and junctions 70 and 66 to the terminal 62. The flow of current through the capacitor 68 and the flow of current through the capacitor 82 will charge those capacitors; and the values of the voltages across those capacitors will approach the peak voltage of the A.C. voltage supplied to the terminals 62 and 64. The left-hand terminal of the capacitor 68 will be negative and the right-hand terminal of that capacitor will be positive, and the upper terminal of the capacitor 82 will be positive while the lower terminal of that capacitor will be negative. At the end of the given half-cycle of the alternating current, the value of the current flowing through the controlled rectifiers 58 and 60 will become so small that those controlled rectifiers will again become non-conductive.

During the next half-cycle of the alternating current supplied to the terminals 62 and 64, current will flow from terminal 62 via junction 66, capacitor 68, junction 72, controlled rectifier 56, junction 74, capacitor 78, and junctions 80 and 84 to the terminal 64. At this time the terminal 62 will be positive relative to the terminal 64 and the right-hand terminal of the capacitor 68 will be positive relative to the left-hand terminal of that capacitor; and hence the voltage across the capacitor 68 will be added to the voltage supplied to the terminals 62 and 64. This means that the voltage developed across the capacitor 78 will approach a value about twice the peak voltage of the A.C. voltage supplied to the terminals 62 and 64. The upper terminal of the capacitor 78 will be positive and the lower terminal of that capacitor will be negative; and since the upper terminal of the capacitor 82 is positive and the lower terminal of that capacitor is negative, the value of the voltage between junctions 74 and 86 will approach a value about three times the peak voltage of the A.C. voltage supplied to the terminals 62 and 64. At the end of that next half-cycle of the alternating current, the value of the current flowing through the controlled rectifier 56 will become so small that the said controlled rectifier will again become non-conductive.

It will be noted that the controlled rectifiers 56 and 58 and the capacitors 68 and 78 develop a voltage across the latter capacitor which can have a value that approaches twice the value of the peak voltage of the A.C. voltage supplied to the terminals 62 and 64. As a result, it should be apparent that the controlled rectifiers 56 and 58 and the capacitors 68 and 78 could be substituted for the controlled rectifiers 20 and 22 and the capacitors 34 and 38 of FIG. 1. However, the controlled rectifiers 56 and 58 and the capacitor 68 supply charges to the charge-storing component of FIG. 2 only on every other half-cycle, whereas the controlled rectifiers 20 and 22 supply charges to the charge-storing component of FIG. 1 on each half-cycle. This means that if the controlled rectifiers 56 and 58 and the capacitors 68 and 78 of FIG. 2 were to be substituted for the controlled rectifiers 20 and 22 and the capacitors 34 and 38 of FIG. 1, the voltage-multiplying circuit of FIG. 1 would be changed from a full-wave voltage-multiplying circuit to a half-wave voltage-multiplying circuit.

If the signal source 90 of FIG. 2 is adjusted to supply firing signals to the controlled rectifiers 56, 58 and 60 close to the ends of the half-cycles of the alternating current supplied to the terminals 62 and 64, the charges supplied to the capacitors 68, 78 and 82 will be reduced; and hence the voltage between junctions 74 and 86 will be reduced. However, the value of the voltage across the capacitor 78 will always be approximately twice the value of the voltage across the capacitor 82.

It should thus be apparent that the voltage-multiplying circuit of FIG. 2 can provide any desired D.C. voltage in the range of zero to about three times the peak value of the A.C. voltage supplied to the terminals 62 and 64. Further, it should be apparent that the value of the voltage supplied to the load 88 can be adjusted merely by adjusting the signal source 90.

Referring to FIG. 3 in detail, the numerals 104, 106, 108 and 110 denote controlled rectifiers which are preferably silicon controlled rectifiers. The numerals 112 and 114 denote terminals which can be connected to a source of alternating current. The terminal 112 is connected to the anode of the controlled rectifier 104 and to the cathode of the controlled rectifier 106 by a junction 116, a capacitor 118 and a junction 120. A junction 122 connects the cathode of the controlled rectifier 104 to the upper terminal of a capacitor 126; and a junction 124 connects the lower terminal of that capacitor to the anode of the controlled rectifier 106. The terminal 112 is connected to the anode of the controlled rectifier 108 by the junction 116, a capacitor 140 and a junction 142; and that terminal is connected to the cathode of the controlled rectifier 110 by the junction 116, the capacitor 140, the junction 142, and a junction 159. A capacitor 128 has the upper terminal thereof connected to the cathode of the controlled rectifier 108 by junctions 132 and 136, and that capacitor has the lower terminal thereof connected to the anode of the controlled rectifier 110 by a junction 134. The junctions 124 and 132 are connected to the terminal 114 by a junction 130. A load 138 has the lower terminal thereof directly connected to the junction 134 and has the upper terminal thereof connected to the junction 122 by a junction 137.

The numeral 144 denotes a signal source which can supply firing signals to the controlled rectifiers 104, 106, 108 and 110. A conductor 146 and the junction 120 connect the cathode of the controlled rectifier 106 to the signal source 144; and a conductor 148 connects the gate of that controlled rectifier to that signal source. A conductor 150 connects the gate of the controlled rectifier 104 to the signal source 144; and a conductor 152 and the junctions 122 and 137 connect the cathode of that controlled rectifier to that signal source. A conductor 154 and the junction 136 connect the cathode of the controlled rectifier 108 to the signal source 144; and a conductor 156 connects the gate of that controlled rectifier to that signal source. A conductor 158 connects the gate of the controlled rectifier 110 to the signal source 144; and a conductor 160 and the junction 159 connect the cathode of that controlled rectifier to that signal source. The signal source 144 can be generally similar to the signal source on page 87 of the said General Electric Controlled Rectifier Manual; but there will be four secondary transformer windings rather than just two secondary transformer windings. Further, the secondary transformer winding to which the conductors 150 and 152 are connected will have the same polarity as the secondary transformer winding to which the conductors 154 and 156 are connected. Also, the secondary transformer winding to which the conductors 146 and 148 are connected will have the same polarity as the secondary transformer winding to which the conductors 158 and 160 are connected. As a result, the controlled rectifiers 104 and 108 will be fired simultaneously, and the controlled rectifiers 106 and 110 will be fired simultaneously.

When the terminals 112 and 114 are connected to a source of alternating current, the terminal 114 will alternately become positive and negative relative to the terminal 112. When the terminal 114 becomes positive relative to the terminal 112, current will tend to flow through controlled rectifier 106, and capacitor 118, and current also will tend to flow through capacitor 128 and controlled rectifier 110. However, current will not be able to flow through the controlled rectifiers 106 and 110 until those controlled rectifiers receive firing signals from the signal source 144. When the terminal 144 is negative relative to the terminal 112, current will tend to flow through capacitor 118, controlled rectifier 104 and capacitor 126, and current also will tend to flow through capacitor 140 and controlled rectifier 108. However, current will not be able to flow through the controlled rectifiers 104 and 108 until those controlled rectifiers receive firing signals from the signal source 144. This means that until the signal source 144 supplies firing signals to the controlled rectifiers 104, 106, 108 and 110, the voltage developed across the capacitor 126 will be zero and the voltage developed across the capacitor 128 will be zero. Consequently, until the signal source 144 supplies firing signals to the controlled rectifiers 104, 106, 108 and 110, the voltage developed across the load 138 will be zero.

If it is assumed that the signal source 144 supplies firing signals to the controlled rectifiers 106 and 110 close to the beginnings of the half-cycles of the alternating current supplied to the terminals 112 and 114, and if it is further assumed that the terminal 114 is positive relative to the terminal 112 during a given half-cycle of that alternating current, current will flow via junctions 130 and 124, controlled rectifier 106, junction 120, capacitor 118, and junction 116 to the terminal 112; and current also will flow from terminal 114 via junctions 130 and 132, capacitor 128, junction 134, controlled rectifier 110, junctions 159 and 142, capacitor 140, and junction 116 to the terminal 112. The flow of current through controlled rectifier 106 and capacitor 118 will charge that capacitor with the right-hand terminal thereof positive and with the left-hand terminal thereof negative; and the value of the voltage across the terminals of that capacitor will approach the peak voltage of the A.C. voltage supplied to the terminals 112 and 114. The flow of current through the capacitor 128, the controlled rectifier 110, and the capacitor 140 will develop voltages across each of those capacitors which have values that are approximately one-half of the peak voltage of the A.C. voltage supplied to the terminals 112 and 114. The upper terminals of the capacitor 128 will be positive and the lower terminal of that capacitor will be negative, and the right-hand terminal of the capacitor 140 will be positive and the left-hand terminal of that capacitor will be negative. At the end of that given half-cycle of the alternating current, the value of the current flowing through the controlled rectifiers 106 and 110 will become so small that those controlled rectifiers will again become nonconductive.

During the next half-cycle of the alternating current supplied to the terminals 112 and 114, the terminal 112 will be positive relative to the terminal 114; and current will flow from terminal 112 via junction 116, capacitor 118, junction 120, controlled rectifier 104, junction 122, capacitor 126, and junctions 124 and 130 to the terminal 114; and current also will flow from the terminal 112 via junction 116, capacitor 140, junction 142, controlled rectifier 108, and junctions 136, 132 and 130 to the terminal 114. Because the terminal 112 is positive relative to the terminal 114, and because the right-hand terminal of the capacitor 118 is positive relative to the left-hand terminal of that capacitor, the voltage across the capacitor 118 will add to the voltage supplied to the terminals 112 and 114; and hence the value of the voltage developed across the capacitor 126 will approach a value about twice the peak voltage of the A.C. voltage supplied to the terminals 112 and 114.

The current which flows through capacitor 140 and the controlled rectifier 108 will quickly discharge that capacitor and then charge that capacitor so the left-hand terminal thereof is positive and the right-hand terminal thereof is negative. Also, that current will charge that capacitor until the value of the voltage across that capacitor approaches the peak voltage of the A.C. voltage supplied to the terminals 112 and 114. This is important because it means that on the third half-cycle of the alternating current supplied to the terminals 112 and 114, the voltage across the capacitor 140 will add to the voltage supplied to the terminals 112 and 114 and will cause the value of the voltage across the capacitor 128 to approach a value about twice the peak voltage of the A.C. voltage supplied to the terminals 112 and 114. At the end of the said next half-cycle of the alternating current, the value of the current flowing through the controlled rectifiers 104 and 108 will become so small that those controlled rectifiers will again become non-conductive.

This means that as long as the terminals 112 and 114 are connected to a source of alternating current and the signal source 144 supplies firing signals to the controlled rectifiers 104, 106, 108 and 110 adjacent the beginnings of the half-cycles of that alternating current, the value of the voltage across the capacitor 126 will be about twice the peak voltage of the A.C. voltage supplied to the terminals 112 and 114, and the value of the voltage developed across the capacitor 128 also will be about that peak voltage. Furthermore, because the upper terminal of the capacitor 126 will be positive and the lower terminal of that capacitor will be negative, and because the upper terminal of the capacitor 128 will be positive and the lower terminal of that capacitor will be negative, the value of the developed voltage across the load 138 will approach four times the peak voltage of the A.C. voltage supplied to the terminals 112 and 114.

The voltage across the load 138 can be reduced by causing the signal source 144 to supply firing signals to the controlled rectifiers 104, 106, 108 and 110 closer to the ends of the half-cycles of the alternating current supplied to the terminals 112 and 114. As a result, the voltage-multiplying circuit of FIG. 3 can develop any desired D.C. voltage across the load 138 between zero and a value close to four times the peak voltage of the A.C. voltage supplied to the terminals 112 and 114.

Referring to FIG. 4 in detail, the numerals 162, 164, 166 and 168 denote controlled rectifiers which are preferably silicon controlled rectifiers. The numerals 170 and 172 denote terminals which can be connected to a source of alternating current. The terminal 170 is connected to the anode of the controlled rectifier 162 by junctions 174 and 176, and is connected to the cathode of the controlled rectifier 164 by junctions 174, 176 and 177. That terminal also is connected to the anode of the controlled rectifier 166 by junctions 174 and 188, and is connected to the cathode of the controlled rectifier 168 by junctions 174, 188 and 190. The cathode of the controlled rectifier 162 is connected to the upper terminal of a capacitor 182 by junctions 179, 178 and 180, and the anode of the controlled rectifier 164 is connected to that upper terminal by the junctions 178 and 180. The lower terminal of that capacitor is connected to the terminal 172 by a junction 186. The upper terminal of a capacitor 184 is connected to the terminal 172 by the junction 186; and the lower terminal of that capacitor is connected to the cathode of the controlled rectifier 166 by junctions 196, 194 and 192 and is connected to the anode of the controlled rectifier 168 by the junctions 196 and 194. A load 198 has the upper terminal thereof connected to the junction 180 and has the lower terminal thereof connected to the junction 196.

The numeral 200 denotes a signal source which can be identical to the signal source disclosed on page 87 of the said General Electric Controlled Rectifier Manual. A conductor 202 connects the gate of the controlled rectifier 162 to the signal source 200; and a conductor 204 and the junction 179 connect the cathode of that controlled rectifier to that signal source. A conductor 206 connects the gate of the controlled rectifier 168 to the signal source 200; and a conductor 208 and the junction 190 connect the cathode of that controlled rectifier to that signal source. The numeral 210 denotes a second signal source; and that signal source can be identical to the signal source 200. A conductor 212 connects the gate of the controlled rectifier 164 to the signal source 210; and a conductor 214 and the junction 177 connect the cathode of that controlled rectifier to that signal source. A conductor 216 connects the gate of the controlled rectifier 166 to the signal source 210; and a conductor 218 and the junction 192 connect the cathode of that controlled rectifier to that signal source.

When the terminals 170 and 172 are connected to a source of alternating current, the terminal 170 will alternately become positive and negative relative to the terminal 172. When the terminal 170 becomes positive relative to the terminal 172, current will tend to flow through controlled rectifier 162 and capacitor 182; and current also will tend to flow through controlled rectifier 166 and capacitor 184. However, current will not be able to flow through the controlled rectifier 162 until that controlled rectifier receives a firing signal from the signal source 200; and current will not be able to flow through the controlled rectifier 166 until that controlled rectifier receives a firing signal from the signal source 210. When the terminal 170 is negative relative to the terminal 172, current will tend to flow through capacitor 182 and controlled rectifier 164; and current also will tend to flow through capacitor 184 and controlled rectifier 168. However, current will not be able to flow through the controlled rectifier 164 until that controlled rectifier receives a firing signal from the signal source 210; and current will not be able to flow through the controlled rectifier 168 until that controlled rectifier receives a firing signal from the signal source 200. This means that until the signal source 200 supplies firing signals to the controlled rectifiers 162 and 168 or the signal source 210 supplies firing signals to the controlled rectifiers 164 and 166, the voltage developed across the capacitor 182 and the voltage developed across the capacitor 184 will be zero. Consequently, until the signal source 200 supplies firing signals to the controlled rectifiers 162 and 168 or until the signal source 210 supplies firing signals to the controlled rectifiers 164 and 166, the voltage developed across the load 198 will be zero.

If it is assumed that the terminals 170 and 172 are connected to a source of alternating current and that the signal source 200 is supplying firing signals to the controlled rectifiers 162 and 168, and if it is further assumed that the terminal 170 is positive relative to the terminal 172 during a given half-cycle of that alternating current, current will flow via junctions 174 and 176, controlled rectifier 162, junctions 179, 178 and 188, capacitor 182, and junction 186 to the terminal 172. The resulting current flow will charge the capacitor 182 with the upper terminal thereof positive and with the lower terminal thereof negative. At the end of that given half-cycle of the alternating current, the value of the current flowing though the controlled rectifier 162 will become so small that the said controlled rectifier will again become non-conductive.

During the next half-cycle of the alternating current supplied to the terminals 170 and 172, current will flow from the terminal 172 via junction 186, capacitor 184, junctions 196 and 194, controlled rectifier 168, and junctions 190, 188 and 174 to the terminal 170. The resulting flow of current through the capacitor 184 will charge that capacitor with the upper terminal thereof positive and the lower terminal thereof negative. Since the capacitor 182 has the upper terminal thereof positive and the lower terminal thereof negative, the voltages across the capacitors 182 and 184 will be applied to the load 198. At the end of that next half-cycle of the alternating current, the value of the current flowing through the controlled rectifier 168 will become so small that the said controlled rectifier will again become non-conductive.

If the signal source 200 supplies firing signals to the controlled rectifiers 162 and 168 close to the beginnings of the half-cycles of the alternating current supplied to the terminals 170 and 172, the voltage across the load 198 will approach a value about twice the peak voltage of the A.C. voltage supplied to the terminals 170 and 172. However, if that signal source supplies firing signals to the controlled rectifiers 162 and 168 close to the ends of the half-cycles of that alternating current, the voltage across the load 198 will be small. This means that by adjusting the firing angle of the signals supplied by the signal source 200, the voltage-multiplying circuit of FIG. 4 can vary the value of the voltage across the load 198 from zero to about twice the peak voltage of the A.C. voltage supplied to the terminals 170 and 172. It will be noted that regardless of the value of the voltage developed across the load 198, the upper terminal of that load will be positive and the lower terminal of that load will be negative as long as the signal source 200 is supplying firing signals to the controlled rectifiers 162 and 168.

If it is assumed that the terminals 170 and 172 are connected to a source of alternating current and that the signal source 210 is supplying firing signals to the controlled rectifiers 164 and 166, and if it is further assumed that the terminal 170 is positive relative to the terminal 172 during a given half-cycle of that alternating current, current will flow via junctions 174 and 188, controlled rectifier 166, junctions 192, 194 and 196, capacitor 184, and junction 186 to the terminal 172. The resulting flow of current will develop a voltage across the capacitor 184, and will render the lower terminal of that capacitor positive while rendering the upper terminal of that capacitor negative. At the end of that given half-cycle of the alternating current, the value of the current flowing through the controlled rectifier 166 will become so small that the said controlled rectifier will again become non-conductive.

During the next half-cycle of the alternating current supplied to the terminals 170 and 172, current will flow from the terminal 172 via junction 186, capacitor 182, junctions 180 and 178, controlled rectifier 164, and junctions 177, 176 and 174 to the terminal 170. The resulting flow of current will develop a voltage across the capacitor 182, and the lower terminal of that capacitor will be positive while the upper terminal of that capacitor will be negative. Since the capacitor 184 has the lower terminal thereof positive and the upper terminal thereof negative, the voltages across the capacitors 184 and 182 will be additive and will be applied to the load 198. At the end of that next half-cycle of the alternating current, the value of the current flowing through the controlled rectifier 164 will become so small that the said controlled rectifier will again become non-conductive.

Significantly, however, the lower terminal of the load 198 will be positive and the upper terminal of the load will be negative, whereas the upper terminal of that load was positive and the lower terminal of that load was negative when the signal source 200 was supplying firing signals to the controlled rectifiers 162 and 168. This means that by selective operation of the appropriate signal source, it is possible to provide the desired polarity for the voltage supplied to the load 198.

By varying the firing angles of the signals supplied to the controlled rectifiers 164 and 166, the signal source 210 can cause the value of the voltage developed across the load 198 to vary from zero to a value approaching twice the peak voltage of the A.C. voltage supplied to the terminals 170 and 172. Consequently, appropriate adjusting of the signal source 210 will make it possible to vary the value of the voltage supplied to the load 198, while maintaining the upper terminal of that load negative.

It is possible, with the voltage-multiplying circuit of FIG. 4, to use the signal source 200 to supply a variable voltage of one polarity to the load 198 and then to use the signal source 210 to supply a variable voltage of opposite polarity to that load. By proper use of the signal sources 200 and 210, it is possible to drive the voltage supplied to the load 198 through zero.

Ordinarily, the signal sources 200 and 210 will not be operated at the same time; and hence whenever the controlled rectifiers 162 and 168 are being operated, the controlled rectifiers 164 and 166 will not be conductive. Similarly, whenever the controlled rectifiers 164 and 166 are being operated, the controlled rectifiers 162 and 168 will not be conductive. If, however, the controlled rectifiers 162 and 166 were to become conductive at the same time, the capacitors 182 and 184 would limit the input current of the voltage-multiplying circuit of FIG. 4. Similarly, if the controlled rectifiers 164 and 168 were to become conductive at the same time, the capacitors 182 and 184 would limit the input current of the voltage-multiplying circuit of FIG. 4.

If desired, the signal source 46 of FIG. 1 could be replaced by two separate signal sources. Similarly, the signal source 90 of FIG. 2 could be replaced by three signal sources, and the signal source 144 of FIG. 3 could be replaced by four signal sources. Also, the signal source 200 of FIG. 4 could be replaced by two signal sources; and the signal source 210 of FIG. 4 could be replaced by two signal sources. Consequently, it should be understood that whenever the phrase "signal source" is used in this description or in the claims, it can refer to one or more signal sources.

The voltage-multiplying circuits of FIGS. 1–4 are shown as they would be used with single phase alternating current circuits. However, where desired, those voltage-multiplying circuits could be used with polyphase alternating current circuits. For example, where desired, the terminals 24 and 26 of two or more voltage-multiplying circuits, like the voltage-multiplying circuit of FIG. 1, could be connected to the various phases of a polyphase alternating current circuit. In such an event, the capacitors of all of these voltage-multiplying circuits could be connected in series—and the upper terminal of the load connected to the upper terminal of the uppermost capacitor while the lower terminal of that load was connected to the lower terminal of the lowermost capacitor—or the series connected capacitors of the various voltage-multiplying circuits could be connected in paraller with each other and with the load. In the former case an additional multiplication of voltage, corresponding to the number of phases used, would be attained. Also, if desired two or more voltage-multiplying circuits like the voltage-multiplying circuit of FIG. 4, could be connected to the various phases of a polyphase alternating current circuit. In such an event, the capacitors of all those voltage-multiplying circuits could be connected in series—and the upper terminal of the load connected to the upper terminal of the uppermost capacitor while the lower terminal of that load was connected to the lower terminal of the lowermost capacitor—or the series connected capacitors of the various voltage-multiplying circuits could be connected in parallel with each other and with the load. In both of these latter cases, the polarity of the load could be controlled by selective operation of the appropriate signal sources.

If desired, firing signals could be supplied to the controlled rectifiers 20 and 22 of FIG. 1 at the same time; and, in such event, only that controlled rectifier which had its anode connected to the positive input terminal would become conductive. Similarly, if desired, firing signals could be supplied to the controlled rectifiers 56, 58 and 60 of FIG. 2 at the same time; and, in such event, any controlled rectifier which had its anode connected to the positive input terminal would become conductive and any controlled rectifier which had its anode connected to the negative input terminal would remain non-conductive. Further, if desired, firing signals could be supplied to the controlled rectifiers 104, 106, 108 and 110 of FIG. 3 at the same time; and, in such event, any controlled rectifier which had its anode connected to the positive input terminal would become conductive and any controlled rectifier which had its anode connected to the negative input terminal would remain non-conductive. In addition, if desired, firing signals could be supplied to the controlled rectifiers 162 and 168 of FIG. 4 at the same time; and, in such event, only that controlled rectifier which had its anode connected to the positive input terminal would become conductive. Alternatively, if desired, firing signals could be supplied to the controlled rectifiers 164 and 166 of FIG. 4 at the same time; and, in such event, only that controlled rectifier which had its anode connected to the positive input terminal would become conductive.

If desired, an inductor could be connected between terminal 24 and junction 28 in FIG. 1, between terminal 62 and junction 66 in FIG. 2, between terminal 112 and junction 116 in FIG. 3, or between terminal 170 and junction 174 in FIG. 4. Such an inductor would limit the values of the peak currents supplied to the capacitors and to the controlled rectifiers of the voltage-multiplying circuit in which it was incorporated. Also, the root mean square of the current supplied to the capacitors and to the controlled rectifiers would be materially reduced.

Whereas the drawing and accompanying description have shown and described several preferred forms of the present invention, it should be apparent to those skilled in the art that various changes may be made in the form of the invention without affecting the scope thereof.

What I claim is:

1. A voltage-multiplying circuit that can convert alternating current to direct current and that can make the value of the resulting D.C. voltage a variable multiple of the A.C. voltage and that comprises:
    (a) a capacitor,
    (b) a second capacitor,
    (c) said capacitors being connected in series relation and having the free terminal of the first said capacitor connectable to one terminal of a load and having the free terminal of said second capacitor connectable to the other terminal of said load,
    (d) a controlled rectifier that is connected in series with the first said capacitor and the source of alternating current,
    (e) a second controlled rectifier that is connected in series with said second capacitor and the source of alternating current,
    (f) a signal source that can supply signals with variable firing angles to said controlled rectifiers,
    (g) the first said and said second controlled rectifiers responding to signals from said signal source to develop D.C. voltages of a predetermined polarity across said capacitors,
    (h) a third controlled rectifier that is connected in series with the first said capacitor and the source of alternating current,
    (i) a fourth controlled rectifier that is connected in series with said second capacitor and the source of alternating current, and
    (j) a second signal source that can supply signals with variable firing angles to said third and said fourth controlled rectifiers,
    (k) said third and said fourth controlled rectifiers responding to signals from said second signal source to develop D.C. voltages of opposite polarity across said capacitors, (l) the first said and said second controlled rectifiers responding to changes in the firing angles of the signals from the first said signal source to be conductive for different lengths of time and to supply charges of different values to said capacitors whereby the voltages across said capacitors can be variable multiples of the A.C. voltage, (m) said third and said fourth controlled rectifiers responding to changes in the firing angles of the signals from said second signal source to be conductive for different lengths of time and to supply charges of different values to said capacitors whereby the voltages across said capacitors can be variable multiples of the A.C. voltage.

2. A voltage-multiplying circuit that can convert alternating current to direct current and that can make the value of the resulting D.C. voltage a variable multiple of the A.C. voltage and that comprises:

(a) a charge-storing component that can be connected to a load, (b) a variable impedance element that is connected in series with said charge-storing component and with said source of alternating current, (c) a second variable impedance element that is connected in series with said charge-storing component and with said source of alternating current, (d) a signal source that can supply signals with variable firing angles to said variable impedance elements, (e) the first said variable impedance element responding to a signal from said signal source during odd-numbered half-cycles of the alternating current to become conductive and thereby permit current to flow through said charge-storing component and charge that charge-storing component, (f) said second variable impedance element responding to a signal from said signal source during even-numbered half-cycles of said alternating current to become conductive and thereby permit current to flow through said charge-storing component and charge that charge-storing component, (g) the first said and said second variable impedance elements responding to signals from said signal source to develop a D.C. voltage of a predetermined polarity across said charge-storing component, (h) said variable impedance elements and said charge-storing component and said signal source coacting to enable said signal source to cause said variable impedance elements to vary the values of the charges supplied to said charge-storing component and thereby vary the voltage which the said charge-storing component can supply, (i) said voltage which the said charge-storing component can supply being variable from zero to a value about twice the peak voltage of said A.C. voltage, (j) a third variable impedance element that is connected in series with said charge-storing component and with said source of alternating current, (k) a fourth variable impedance element that is connected in series with said charge-storing component and with said source of alternating current, and (l) a second signal source that can supply signals with variable firing angles to said third and said fourth variable impedance elements, (m) said third variable impedance element responding to a signal from said second signal source during even-numbered half-cycles of the alternating current to become conductive and thereby permit current to flow through said charge-storing component and charge that charge-storing component, (n) said fourth variable impedance element responding to a signal from said second signal source during odd-numbered half-cycles of the alternating current to become conductive and thereby permit current to flow through said charge-storing component and charge that charge-storing component, (o) said third and said fourth variable impedance elements responding to signals from said second signal source to develop a D.C. voltage of opposite polarity across said charge-storing component, (p) said third and said fourth variable impedance elements and said charge-storing component and said second signal source coacting to enable said second signal source to cause said third and said fourth variable impedance elements to vary the values of the charges supplied to said charge-storing component and thereby vary the voltage which the said charge-storing component can supply, (q) said voltage which the said charge-storing component can supply, when said second signal source is supplying firing signals to said third and said fourth variable impedance elements, being variable from zero to a value about twice the peak voltage of said A.C. voltage.

3. A voltage-multiplying circuit that can convert alternating current to direct current and that can make the value of the resulting D.C. voltage a variable multiple of the A.C. voltage and that comprises:

(a) a charge-storing component that can be connected to a load, (b) a variable impedance element that is connected in series with said charge-storing component and with said source of alternating current, (c) a second variable impedance element that is connected in series with said charge-storing component and with said source of alternating current, (d) a signal source that can supply signals with variable firing angles to said variable impedance elements, (e) the first said variable impedance element responding to a signal from said signal source during odd-numbered half-cycles of the alternating current to become conductive and thereby permit current to flow through said charge-storing component and charge that charge-storing component, (f) said second variable impedance element responding to a signal from said signal source during even-numbered half-cycles of said alternating current to become conductive and thereby permit current to flow through said charge-storing component and charge that charge-storing component, (g) the first said and said second variable impedance elements responding to signals from said signal source to develop a D.C. voltage of a predetermined polarity across said charge-storing component, (h) said variable impedance elements and said charge-storing component and said signal source coacting to enable said signal source to cause said variable impedance elements to vary the values of the charges supplied to said charge-storing component and thereby vary the voltage which the said charge-storing component can supply, (i) said voltage which the said charge-storing component can supply being variable from zero to a value about twice the peak voltage of said A.C. voltage, (j) a third variable impedance element that is connected in series with said charge-storing component and with said source of alternating current, (k) a fourth variable impedance element that is connected in series with said charge-storing component and with said source of alternating current, and (l) a second signal source that can supply signals with variable firing angles to said third and said fourth variable impedance elements, (m) said third variable impedance element responding to a signal from said second signal source during even-numbered half-cycles of the alternating current to become conductive and thereby permit current to flow through said charge-storing component and charge that charge-storing component, (n) said fourth variable impedance element responding to a signal from said second signal source during odd-numbered half-cycles of the alternating current to become conductive and thereby permit current to flow through said charge-storing component and charge that charge-storing component, (o) said third and said fourth variable impedance elements responding to signals from said second signal source to develop a D.C. voltage of opposite polarity across said charge-storing component, (p) said third and said fourth variable impedance elements and said charge-storing component and said second signal source coacting to enable said second signal source to cause said third and said fourth variable impedance elements to vary the values of the charges supplied to said charge-storing component and thereby vary the voltage which the said charge-storing component can supply, (q) said voltage which the said charge-storing component can supply, when said second signal source is supplying firing signals to said third and said fourth variable impedance elements, being variable from zero to a value about twice the peak voltage of said A.C. voltage, (r) said charge-storing component being a capacitor with at least two sections, (s) the first said variable impedance element and said third variable impedance element being connected to one section of said capacitor, (t) said second variable impedance element and said fourth variable impedance element being connected to a further section of said capacitor, (u) said signal sources normally not operating simultaneously, (v) whereby the first said variable impedance element and said third variable impedance element normally do not conduct current at the same time, and whereby said second variable impedance element and said fourth variable impedance element normally do not conduct current at the same time.

References Cited by the Examiner
UNITED STATES PATENTS

| | | | |
|---|---|---|---|
| 2,552,203 | 5/1951 | Morgan | 321—15 |
| 2,740,938 | 3/1956 | Diggs | 321—15 |
| 2,920,240 | 1/1960 | Macklem. | |
| 3,121,835 | 2/1964 | Diebold. | |
| 3,152,296 | 10/1964 | Meszaros | 321—18 |

JOHN F. COUCH, *Primary Examiner.*

M. L. WACHTELL, *Assistant Examiner.*